United States Patent [19]

Simone

[11] Patent Number: 5,709,833
[45] Date of Patent: Jan. 20, 1998

[54] PIVOTING WORKPIECE REMOVAL METHOD

[75] Inventor: John Di Simone, Woodbridge, Canada

[73] Assignee: Husky Injection Molding Systems Ltd., Canada

[21] Appl. No.: 608,755

[22] Filed: Feb. 29, 1996

Related U.S. Application Data

[62] Division of Ser. No. 263,815, Jun. 22, 1994, Pat. No. 5,518,387.

[51] Int. Cl.[6] .................................................. B29C 45/76
[52] U.S. Cl. ........................ 264/328.1; 264/334; 425/139; 425/556
[58] Field of Search .......................... 264/328.1, 334; 425/139, 554, 556, 444

[56] References Cited

U.S. PATENT DOCUMENTS

| | | | |
|---|---|---|---|
| 4,449,914 | 5/1984 | Schmidts et al. | 264/334 |
| 4,976,603 | 12/1990 | Disimone | 425/556 |
| 4,994,224 | 2/1991 | Itoh et al. | 264/335 |
| 5,000,654 | 3/1991 | Shiotani | 264/334 |
| 5,037,597 | 8/1991 | McGinley et al. | 264/334 |
| 5,185,119 | 2/1993 | Schad et al. | 264/334 |
| 5,250,239 | 10/1993 | Herbst | 264/334 |
| 5,295,802 | 3/1994 | Herbst | 264/334 |
| 5,513,970 | 5/1996 | Kimura et al. | 264/334 |

Primary Examiner—Jill L. Heitbrink
Attorney, Agent, or Firm—Bachman & LaPointe, P.C.

[57] ABSTRACT

A high speed, automatic device for removal of molded plastic articles from a multicavity injection mold including a method of minimizing molding machine cycle time.

6 Claims, 3 Drawing Sheets

PIVOTING WORKPIECE REMOVAL METHOD

This is a division of application Ser. No. 08/263,815, filed Jun. 22, 1994, now U.S. Pat. No. 5,518,387.

FIELD OF THE INVENTION

The present invention relates to molded product retrieval from high speed injection molding machines including a method of minimizing injection molding machine cycle time.

BACKGROUND OF THE INVENTION

Rapid removal of plastic articles from an injection mold can provide benefits such as faster cycle times and article orientation after the demolding process. Part removal systems suitable for use with high speed molds are described in U.S. Pat. No. 4,976,603, European Patent Application 0 415 153 and in PCT Patent Application 93/11923. Each of these disclosures show a pivoting workpiece removal device which incorporates arms which swing in from an outboard position and secure the molded part on suction cups or other vacuum means, at the extremity of the arm. The arms then swing to the outboard position and the mold is ready to close for the next injection cycle. The motive means for the swing of the arms is shown to be a cam and a cam follower plus a linkage assembly or a rack and pinion which directly position the pick-up arms relative to the movement of the opening mold. This approach carries with it a variety of disadvantages.

Firstly, engineering the proposed designs can be a laborious task of generating an optimized cam profile with accompanying linkage or gearing components which serve to move the arms into an open mold, pick up the article and move the arms to the outboard position. If the cam profile is aggressive, causing high acceleration and deceleration rates, the inertia of the moving masses will soon result in damaged or prematurely worn components. If the profile is to be made less aggressive, thereby reducing acceleration and deceleration rates, extra time will be spent for the mold to travel a further linear distance in its opening stroke than is actually required for clearing the swing arm motion. This results in a disadvantageously longer cycle time. Furthermore, the injection molding machine platens may not permit sufficiently long cams to be incorporated due to interference between the cams and the platens. Increased machine opening stroke requirement is also of concern, especially if a multilevel stack mold with more than one molding face is to be installed.

Reducing the moving masses of cams and cam followers to decrease the effect of inertia has to be balanced against required structural strength and rigidity.

A further disadvantage in the cam and cam follower system is that such a system does not take into account that the linear stroke of the mold halves must be larger when the retrieval arm is loaded and that less clearance is required when the empty retrieval device is in route to a product pick up position.

That is, in the present invention the opening stroke of the mold halves must be of sufficient linear distance to provide clearance for a loaded retriever to swing outwardly freely and without interference to a discharge position.

Obviously, an empty retriever requires less clearance. Therefore, the timing of the motion of the retriever in the empty condition can be set so that in the empty condition the retrieval can be programmed to swing inwardly to a loading position before the mold opening stroke is completed. Therefore, the outward swing of a loaded retriever requires a mold linear opening stroke which is a function of the size of the molded article while the inward swing of an empty retriever requires less linear space and occurs when the mold opening stroke reaches a predetermined or fixed linear dimension in the course of the mold opening stroke.

Consequently, the prior art cam operated retrieval devices waste cycle time by activating the retrieval device, loaded or unloaded, at the same linear mold opening strokes.

Additional cycle time is lost because of the nature of a cam system. For example, in a cam system, which is responsive to the motion and position of the mold halves, the mold opening stroke is not governed or limited merely by the clearance required for an empty retrieval arm to enter the open mold; the system requires continued motion of the mold halves in the opening direction effective to continue cam action to drive the retrieval arm into the open mold. Obviously, this occurrence is a waste of cycle time.

Adjustability of prior art systems also presents a difficulty. Since all the elements of the system integrate mechanically, a change in movement speed or position requires replacement components appropriately designed and precisely manufactured. If even one of the various components of the system is incorrectly sized or positioned, the adverse affect could cause improper or ineffective article removal. This situation can cause numerous delays and expense in the "fine tuning" of the operating system.

In addition, there is a lack of flexibility in a mechanical approach. As each mold and molded article can have a different shape or size, the cam and linkage assembly must be individually engineered for optimal function. Convenient and economical interchangeability of componentry between similar but not identical molds is thereby restricted.

A further disadvantage of the prior art is found in the space that it occupies at the top and bottom of the mold. Cams, linkages and gears all occupy an area which otherwise would be used for mold services such as air, water and electrical supply. This adds complication and engineering effort to reroute these services to less desirable connection points. In some cases, it may be mandatory for the services to be located on the mold such that the cam and linkage assembly must be spaced from the mold using extensions and adapters. This can disadvantageously add significant height to the overall mold assembly causing further mold handling difficulties.

OBJECTS OF THE INVENTION

Accordingly, it is an object of the present invention to provide an improved device for removing plastic articles from an injection mold.

It is a further object of the present invention to provide a device which simplifies and accelerates the engineering, manufacturing, assembly and maintenance of the removal system while minimizing changes to the surrounding mold design.

It is a further object of the present invention to provide a device which is more durable and compact in size.

It is a further object of the present invention to provide a device which will provide maximum speed and efficiency in part removal in all directions of travel i.e., time and mold opening stroke to accommodate a loaded retriever vs. time and stroke to accommodate an empty retriever.

It is a further object of the present invention to provide a device which is readily flexible and adjustable with respect to machine speed, stroke and molded product processing.

For example, since the present invention responds to a program, the retrieval arms can be activated independently of the position of the mold halves thereby providing the opportunity to direct a loaded retrieval arm to interact with other instrumentalities dealing with further processing of a molded article such as labelling, packaging and so forth.

It is a further object of the present invention to provide a device which utilizes a higher degree of standardization and a modular approach so as to realize economic benefits.

It is a further object to reduce the overall mold stroke required to operate the mold.

A further feature of the invention is the provision of a retrieval device which moves to a product "pick up" position before the mold opening stroke is completed saving cycle time.

A still further feature of the invention is the provision of a method of adjusting the cyclic operation of an article retrieval device so that the linear opening stroke of the molding machine defines two different dimensions, one stroke dimension being a function of a first motion of the retrieval device and a second stroke dimension being a function of a second motion of the retrieval device.

SUMMARY OF THE INVENTION

A representative embodiment of the present invention includes a rotatable vertical shaft secured to a fixed or a movable platen of an injection molding machine by suitable bearings. The shaft is driven in reversible fashion by a servo motor or other suitable motive device fixed to the shaft. At least one retrieval arm carrying a suitable article "pick up" device is attached to the shaft and is swingable (rotated) cyclically in a first direction inwardly relative to a partial opening stroke of the molding machine and outwardly in a second direction relative to a full opening stroke of the machine. The first motion corresponds to an empty pick up device and the second motion corresponds to a loaded pick up device.

In an injection molding machine having at least one mold station, said mold station including at least two relatively movable plate means supporting cooperating mold halves, said machine having power means for moving plate means so that the mold halves assume an open and a closed position according to a definite stroke and a definite speed in cyclic fashion, said mold halves in the closed position being operable to mold a plastic article, an improvement embracing certain principles of the present invention may comprise movable means supported by one of said mold plate means, means for retrieving a molded article when the mold halves are in the open position carried by said movable means, motive means having a cycle of operation for moving the movable means in a first direction corresponding to a partial open position of said mold halves and in a second direction corresponding to a full open position, power means for energizing said motive means, computer means for controlling and adjusting the cycle of operation of said motive means, said computer means being readily and easily settable while the mold is in the molding machine whereby the movable means is operable to accommodate precisely a plurality of different strokes and speeds of said injection molding machine.

A method of minimizing the cycle time of an injection molding having a linear stroke, said machine including a movable molded article retrieval device attached to the machine, said retrieval device being movable relative to said linear stroke, a first motion of said retrieval device corresponding to an empty condition and a second motion of said device corresponding to a loaded condition, utilizing other principles of the invention may comprise the steps of providing an adjustable motive means for operating and controlling the retrieval device, adjusting the motive means so that the linear stroke of the molding machine defines a first stroke corresponding to said first motion of said retrieval device, and, adjusting the motive means further so that the linear stroke of the molding machine defines a second stroke corresponding to said second motion of said retrieval device.

Further features and advantages of the present invention will become more apparent from an examination of the proceeding specification when read in conjunction with the appended drawings in which;

DETAILED DESCRIPTION OF THE INVENTION

Figure 1:
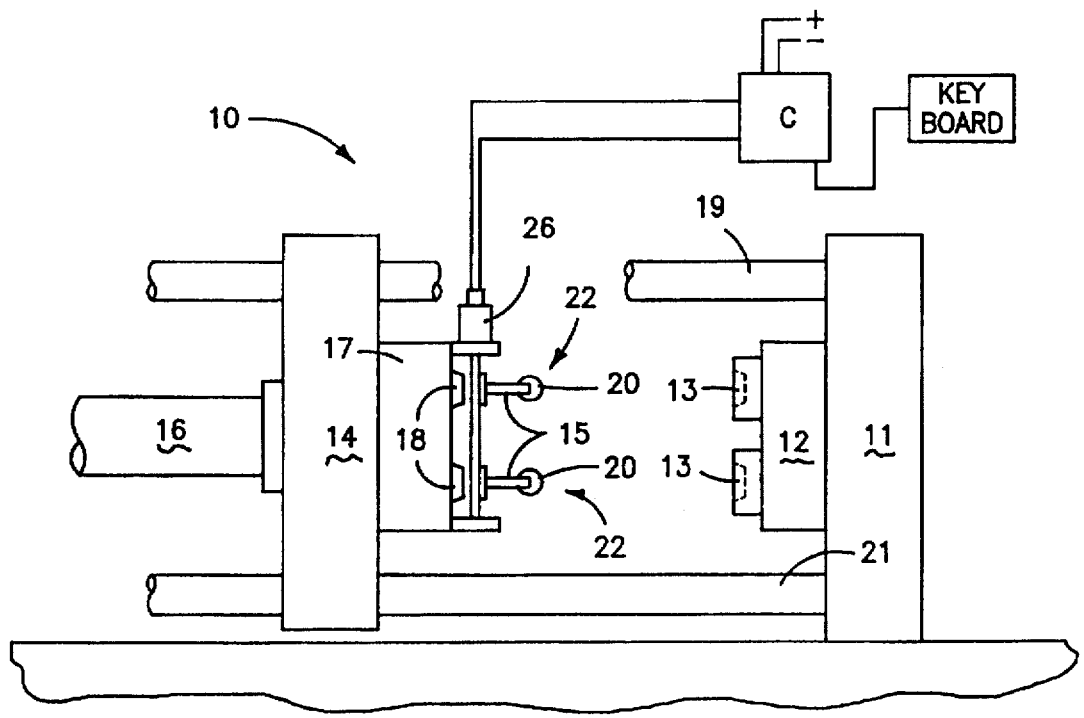
FIG. 1 is a side elevation of a single mold station showing the retrieval device fixed to a movable platen with the mold in an exaggerated open position.

Referring in detail to the drawings, reference numeral 10 designates an injection molding machine having a fixed platen 11 carrying a mold plate 12 in turn supporting mold halves or cavities 13. A movable platen 14 operated by a ram 16 reciprocated in well known fashion by power means not shown.

The movable platen 14 supports a mold plate 17 in turn carrying mold halves in the form of mold cores 18.

Tie bars 19 and 21 extend from fixed platen 11 and the movable platen 14 reciprocates along the tie bars in its usual and customary manner.

A molded article retrieval device, indicated generally by the reference numeral 22 comprises a vertical rotatable shaft 23 supported by bearings 24 in turn fixed to platen 14. The shaft supports arms 15 each terminating in a product pick up unit such as suction cups 20.

Figure 2:
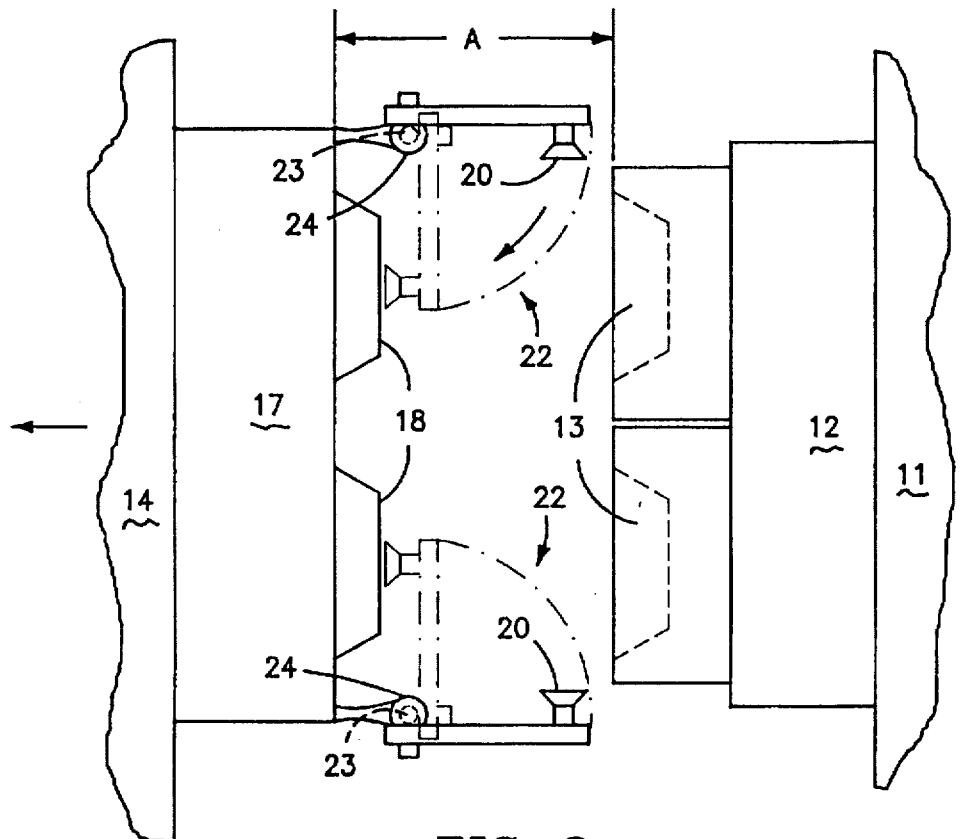
FIG. 2 is a top view showing a partial mold open stroke of dimension A providing clearance for an empty pick up or retriever unit having moved into pick up position.
Figure 3:
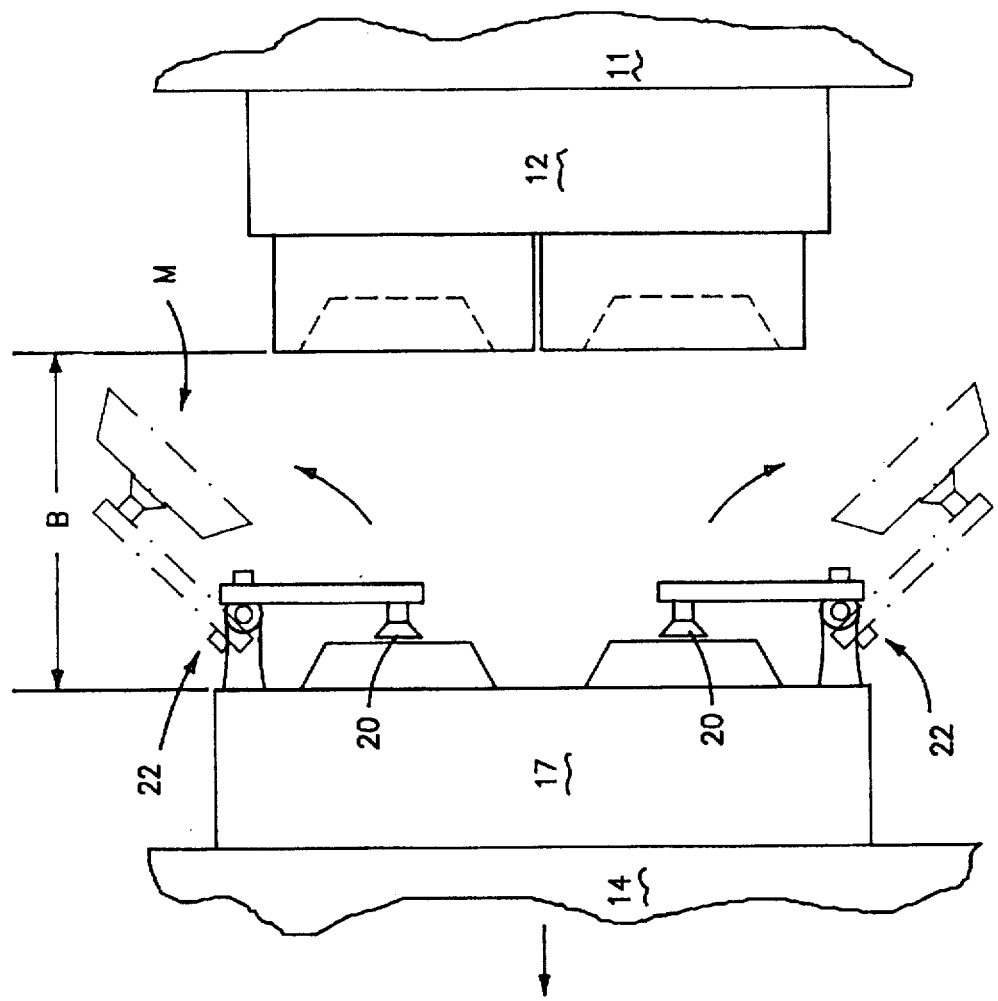
FIG. 3 is similar to FIG. 2 showing the mold in the full open (dimension B) position.

A servo motor 26 fixed to shaft 23 under control of computer C operates to rotate shaft 23 reversibly to swing the arms 15 inwardly to a pick up position as shown in FIG. 2 and outwardly in a product loaded condition as shown in FIG. 3.

Obviously, the retrieval devices 22 can be mounted on the fixed platen as well as upon the movable platen and are positioned upon opposite sides of the platens as the arrangement and distribution of the mold pattern and size of the molded article dictate.

In addition, there may be one or more arms 15 carried by rotatable shafts 23 and the design of the pick up unit at the ends of the arms may take a variety of forms as considerations of size of molded article, number of mold cavities and other engineering considerations require.

Referring to FIG. 2, assume that the movable platen 14 is in the course of a mold opening stroke in the direction indicated by the arrow 27 and the arm 15 is empty in outward solid line position.

When the mold is partially open, defined by a linear dimension A, the computer program directs the servo motor to swing the empty arm 15 inwardly to the dotted or product pick up position.

Since the retrieval device 22 is empty the linear dimension A provides adequate clearance for the pick up head or vacuum cup 20.

Referring to FIG. 3, assume that the mold has reached its full open stroke B so that the loaded arm 16 driven by servo motor 26 under the command of the computer C swings the loaded arm from the solid line position to the dotted line position defining an unloading position. The part may be released at any time after reaching the unloading position.

Figure 4:
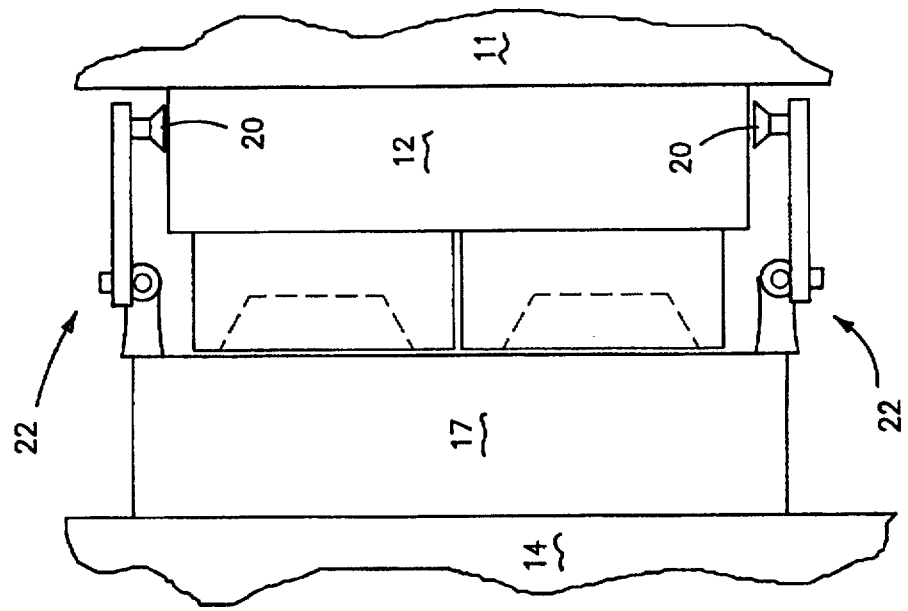
FIG. 4 is similar to FIGS. 2 and 3 showing the mold fully closed.

Thereafter, the mold is closed as shown in FIG. 4 and the unloaded retrieval unit 22 is poised to swing into the FIG. 2 position when the next opening stroke of the mold reaches linear dimension A and the cycle just described is repeated.

Figure 5:
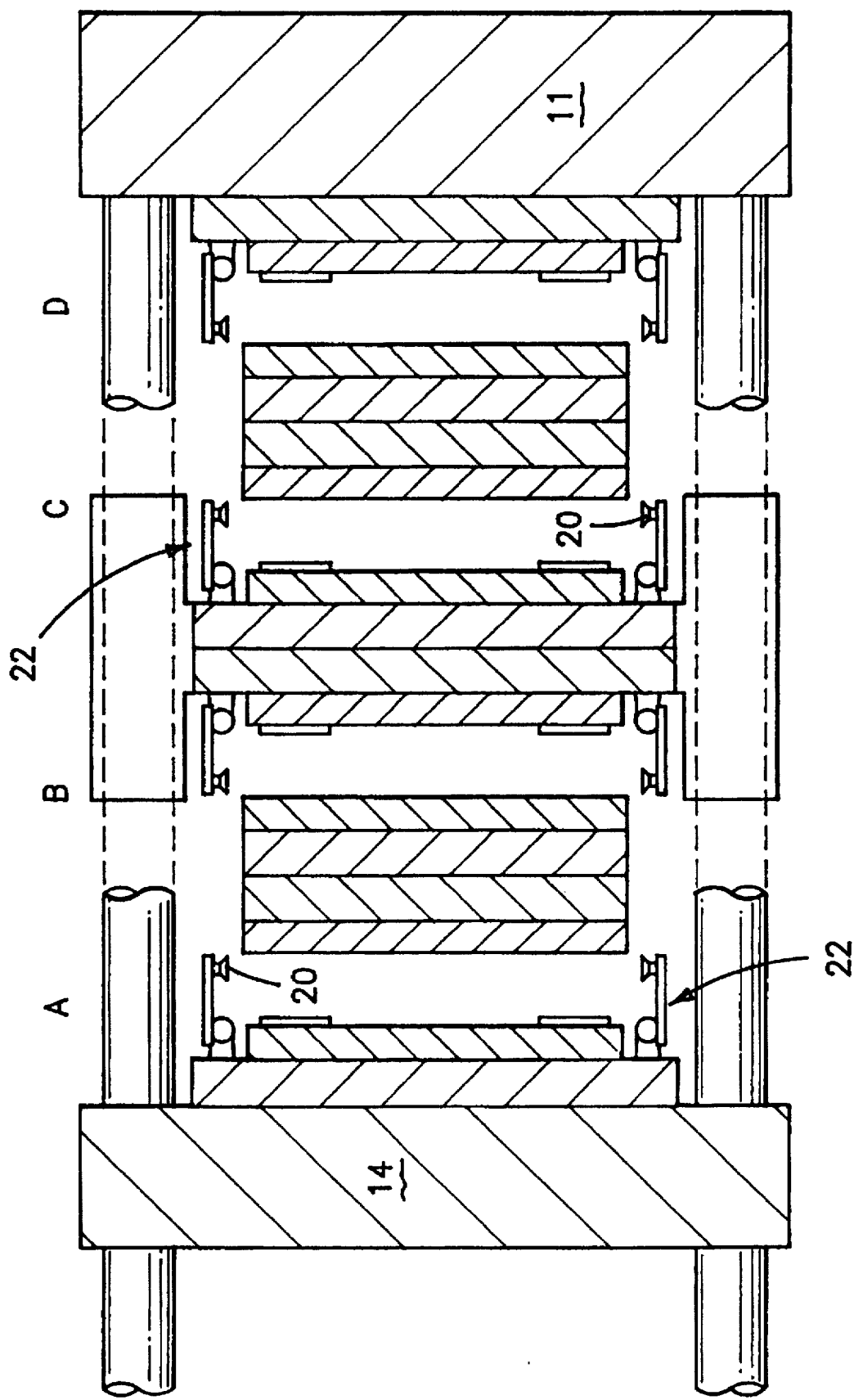
FIG. 5 is a top plan view showing schematically a retrieval unit of the present invention incorporated in a multi-station stack mold.

FIG. 5 shows schematically the retrieval device of the present invention as an adjunct to a multi-station or stack mold having mold stations A, B, C and D.

Obviously, the program of the computer must be changed from product configuration to product configuration to set the linear dimension B to provide the proper clearance consistent with the size and configuration of the molded article.

The linear dimension A can remain fixed for a given length of arm 15 plus its empty pick up unit.

Therefore, it is to be noted that molding machine cycle time is reduced by directing an empty retrieval unit to enter the opening mold when the opening stroke is only partially completed.

In addition, there is no need to change the structure of the retrieval unit to change the full open stroke of the mold. One merely programs the computer to provide the desired full open stroke thereby providing clearance for the particular article being mass produced.

The computer control also provides manual keyboard access to the computer to "fine tune" a selected program thereby maximizing the reduction in mold cycle time.

As stated earlier, the present invention provides a simple method and uncomplicated machinery for reducing molding cycle time in contrast to mechanical systems which include cam systems that are individual to each product and which require considerable "down time" to change systems.

It is anticipated that a variety of embodiments of the method and structure of the present invention may be devised without departing from the spirit and scope thereof.

For example, it is entirely within the scope of the invention that the molding machine include sensors such as photoelectric cells for detecting the presence or absence of a molded article on the pick-up arm, the position of the pick-up arm and to monitor the required stroke of the mold halves.

What is claimed is:

1. A method of minimizing the cycle time of an injection molding machine having a full linear stroke corresponding to the full open condition of the machine, said machine including a rotatably movable molded article retrieval device attached to the machine, said retrieval device including an arm having a length and rotatable about an axis generally perpendicular to said linear stroke, a first rotary motion of said retrieval device corresponding to an empty condition and a second rotary motion of said device corresponding to a loaded condition;

comprising the steps of:

providing an adjustable motive means for operating and controlling the rotatable retrieval device;

adjusting the motive means so that said first rotary motion of the retrieval device corresponds to a first linear stroke of the injection molding machine which is less than the full linear stroke, for movement of the retrieval device in an empty condition, wherein the first linear stroke is at least equal to the length of the arm of the retrieval device;

adjusting the motive means further so that said second rotary motion of the retrieval device corresponds to a second linear stroke of the injection molding machine which is greater than said first linear stroke, for movement of said retrieval device in a loaded condition; and including the steps of rotating the empty retrieval device in said first rotary motion to retrieve a molded article in the first linear stroke, and rotating the retrieval device in said second rotary motion with a molded article in said second linear stroke.

2. The method of claim 1 wherein the first linear stroke is a fixed dimension and the second linear stroke is a function of the size of the molded article.

3. The method of claim 1, wherein the second linear stroke is equal to the full linear stroke.

4. The method of claim 1, wherein the adjustable motor means is a servo motor.

5. The method of claim 1, including the step of providing a plurality of said retrieval devices for removal of molded articles from a multi-station mold.

6. The method of claim 1, including the step of controlling the motive means via a computer means.

* * * * *